(12) United States Patent
Westerman

(10) Patent No.: US 9,372,576 B2
(45) Date of Patent: Jun. 21, 2016

(54) IMAGE JAGGEDNESS FILTER FOR DETERMINING WHETHER TO PERFORM BASELINE CALCULATIONS

(75) Inventor: Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1419 days.

(21) Appl. No.: 12/238,333

(22) Filed: Sep. 25, 2008

(65) Prior Publication Data

US 2009/0174688 A1 Jul. 9, 2009

Related U.S. Application Data

(60) Provisional application No. 61/019,222, filed on Jan. 4, 2008.

(51) Int. Cl.
*G06F 3/041* (2006.01)
*G06F 3/0488* (2013.01)

(52) U.S. Cl.
CPC .......... *G06F 3/0418* (2013.01); *G06F 3/04883* (2013.01)

(58) Field of Classification Search
CPC ..... G06F 3/041; G06F 3/0416; G06F 3/0418; G06F 2203/04104; G06F 3/04883
USPC .............. 345/173–178; 178/18.01–18.11, 178/20.01–20.04; 341/5, 20; 323/904
See application file for complete search history.

(56) References Cited

U.S. PATENT DOCUMENTS

| | | | |
|---|---|---|---|
| 4,550,221 A * | 10/1985 | Mabusth | 178/18.06 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |

(Continued)

FOREIGN PATENT DOCUMENTS

| EP | 1 717 677 A2 | 11/2006 |
|---|---|---|
| EP | 1 717 677 A3 | 11/2006 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Keith Crawley
(74) *Attorney, Agent, or Firm* — Morrison & Foerster LLP

(57) ABSTRACT

An image jaggedness filter is disclosed that can be used to detect the presence of ungrounded objects such as water droplets or coins, and delay periodic baseline adjustments until these objects are no longer present. To do otherwise could produce inaccurate normalized baseline sensor output values. The application of a global baseline offset is also disclosed to quickly modify the sensor offset values to account for conditions such as rapid temperature changes. Background pixels not part of any touch regions can be used to detect changes to no-touch sensor output values and globally modify the sensor offset values accordingly. The use of motion dominance ratios and axis domination confidence values is also disclosed to improve the accuracy of locking onto dominant motion components as part of gesture recognition.

25 Claims, 9 Drawing Sheets

(56) References Cited

U.S. PATENT DOCUMENTS

| | | | |
|---|---|---|---|
| 5,914,465 A * | 6/1999 | Allen et al. | 178/18.06 |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,456,952 B1 * | 9/2002 | Nathan | 702/94 |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,337,085 B2 | 2/2008 | Soss | |
| 7,504,833 B1 * | 3/2009 | Seguine | 324/672 |
| 7,663,607 B2 | 2/2010 | Hotelling et al. | |
| 7,719,523 B2 | 5/2010 | Hillis | |
| 8,026,904 B2 * | 9/2011 | Westerman | 345/173 |
| 8,045,783 B2 | 10/2011 | Lee et al. | |
| 8,125,312 B2 * | 2/2012 | Orr | 340/5.31 |
| 8,479,122 B2 | 7/2013 | Hotelling et al. | |
| 2003/0164820 A1 * | 9/2003 | Kent | 345/177 |
| 2003/0210235 A1 * | 11/2003 | Roberts | 345/173 |
| 2004/0188151 A1 * | 9/2004 | Gerpheide et al. | 178/18.01 |
| 2005/0012724 A1 * | 1/2005 | Kent | 345/177 |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2006/0202969 A1 * | 9/2006 | Hauck | 345/173 |
| 2006/0238522 A1 | 10/2006 | Westerman et al. | |
| 2006/0267953 A1 * | 11/2006 | Peterson et al. | 345/173 |
| 2006/0279548 A1 * | 12/2006 | Geaghan | 345/173 |
| 2006/0293864 A1 * | 12/2006 | Soss | 702/104 |
| 2007/0023523 A1 | 2/2007 | Onishi | |
| 2007/0075982 A1 | 4/2007 | Morrison et al. | |
| 2007/0268273 A1 | 11/2007 | Westerman et al. | |
| 2007/0268275 A1 | 11/2007 | Westerman et al. | |
| 2008/0036742 A1 * | 2/2008 | Garmon | 345/173 |
| 2008/0042986 A1 | 2/2008 | Westerman et al. | |
| 2008/0042987 A1 | 2/2008 | Westerman et al. | |
| 2008/0047764 A1 * | 2/2008 | Lee et al. | 178/18.06 |
| 2008/0062151 A1 * | 3/2008 | Kent | 345/177 |
| 2008/0136792 A1 * | 6/2008 | Peng et al. | 345/174 |
| 2008/0158146 A1 | 7/2008 | Westerman | |
| 2008/0158172 A1 | 7/2008 | Hotelling et al. | |
| 2008/0158174 A1 * | 7/2008 | Land et al. | 345/173 |
| 2008/0158181 A1 | 7/2008 | Hamblin et al. | |
| 2008/0158182 A1 | 7/2008 | Westerman | |
| 2008/0158185 A1 * | 7/2008 | Westerman | 345/173 |
| 2008/0162996 A1 * | 7/2008 | Krah et al. | 714/27 |
| 2008/0309626 A1 | 12/2008 | Westerman et al. | |
| 2008/0309632 A1 | 12/2008 | Westerman et al. | |
| 2009/0020343 A1 * | 1/2009 | Rothkopf et al. | 178/18.05 |
| 2009/0114456 A1 * | 5/2009 | Wisniewski | 178/18.03 |
| 2009/0128516 A1 | 5/2009 | Rimon et al. | |
| 2009/0135157 A1 * | 5/2009 | Harley | 345/174 |
| 2009/0160787 A1 | 6/2009 | Westerman et al. | |
| 2009/0174676 A1 | 7/2009 | Westerman | |
| 2010/0079401 A1 | 4/2010 | Staton | |
| 2011/0199105 A1 | 8/2011 | Otagaki et al. | |
| 2011/0227874 A1 | 9/2011 | Faahraeus et al. | |
| 2011/0241907 A1 * | 10/2011 | Cordeiro | 341/20 |
| 2011/0261005 A1 | 10/2011 | Joharapurkar et al. | |
| 2011/0261007 A1 | 10/2011 | Joharapurkar et al. | |
| 2011/0310064 A1 * | 12/2011 | Keski-Jaskari et al. | 345/178 |
| 2012/0262395 A1 * | 10/2012 | Chan | 345/173 |
| 2013/0271427 A1 | 10/2013 | Benbasat | |

FOREIGN PATENT DOCUMENTS

| | | |
|---|---|---|
| JP | 2000-163031 A | 6/2000 |
| JP | 2002-342033 A | 11/2002 |
| WO | WO-99/35633 A2 | 7/1999 |
| WO | WO-2006/020305 A2 | 2/2006 |
| WO | WO-2006/020305 A3 | 2/2006 |
| WO | WO-2007/089766 A1 | 8/2007 |
| WO | WO-2013/158570 A1 | 10/2013 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Mar. 9, 2012, for U.S. Appl. No. 12/238,342, filed Sep. 25, 2008, 26 pgs.

European Search Report mailed Apr. 25, 2012, for EP Patent Application No. 08022505.5, 12 pages.

Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.

Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-120.]

Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.

Non-Final Office Action mailed Feb. 15, 2013, for U.S. Appl. No. 12/238,342, filed Sep. 25, 2008, 17 pages.

Final Office Action mailed Aug. 13, 2013, for U.S. Appl. No. 12/238,342, filed Sep. 25, 2008, 14 pages.

Non-Final Office Action mailed Mar. 12, 2014, for U.S. Appl. No. 12/238,342, filed Sep. 25, 2008, 15 pages.

Final Office Action mailed Oct. 22, 2014, for U.S. Appl. No. 13/448,182, filed Apr. 16, 2012, 11 pages.

International Search Report mailed Aug. 6, 2013, for PCT Application No. PCT/US2013/036662, filed Apr. 15, 2013, three pages.

Non-Final Office Action mailed Jan. 31, 2014, for U.S. Appl. No. 13/448,182, filed Apr. 16, 2012, 18 pages.

Final Office Action mailed Oct. 22, 2014, for U.S. Appl. No. 12/238,342, filed Sep. 25, 2008, 16 pages.

Final Office Action mailed Jun. 11, 2015, for U.S. Appl. No. 13/448,182, filed Apr. 16, 2012, 12 pages.

\* cited by examiner

IMAGE JAGGEDNESS FILTER FOR DETERMINING WHETHER TO PERFORM BASELINE CALCULATIONS

CROSS REFERENCE TO RELATED APPLICATIONS

This application claims the benefit of U.S. Provisional Patent Application No. 61/019,222 filed on Jan. 4, 2008, the contents of which are incorporated herein by reference in their entirety for all purposes.

FIELD OF THE INVENTION

This relates to touch sensor panels used as input devices for computing systems, and more particularly, to the normalization and post-processing of touch sensor data.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned partially or completely in front of a display screen, or integrated partially or entirely within the display screen, so that at least a portion of the touch-sensitive surface covers at least a portion of the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be capable of detecting either single-touch events or multiple touch events, an example of which is described in Applicant's co-pending U.S. application Ser. No. 11/649,998 entitled "Proximity and Multi-Touch Sensor Detection and Demodulation," filed on Jan. 3, 2007, the contents of which are incorporated by reference herein in their entirety for all purposes.

To provide a more uniform response from the touch sensor panel given the same amount of touch, the sensor output values can be calibrated or normalized by using offset values to compensate the raw no-touch output values for each sensor in the panel so that all sensor output values are normalized to approximately the same value. A periodic local baseline offset adjustment algorithm can then be employed to locally update the sensor offset values to account for variables such as temperature drift. However, when ungrounded objects such as water droplets or coins are present on the touch sensor panel, the periodic local baseline offset adjustment algorithm can generate inaccurate normalized results. Furthermore, factors such as temperature changes can rapidly skew the normalized sensor output values. In addition, when processing touch data to recognize gestures, it can be difficult to clearly identify and lock onto a particular dominant motion component as a preliminary step in recognizing a particular gesture.

SUMMARY OF THE INVENTION

This relates to an image jaggedness filter that can be used to detect the presence of ungrounded objects such as water droplets or coins on a touch sensor panel, and delay periodic local offset adjustments until these objects have largely disappeared. To do otherwise could produce inaccurate normalized sensor output values. This also relates to the application of a global baseline offset to quickly normalize the sensor output values to account for conditions such as rapid temperature changes. Background pixels not part of any touch regions can be used to detect changes to no-touch sensor output values and compute a global baseline offset accordingly. This also relates to the use of motion dominance ratios and axis domination confidence values to improve the accuracy of locking onto dominant motion components as part of gesture recognition.

DETAILED DESCRIPTION OF THE PREFERRED EMBODIMENT

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to an image jaggedness filter that can be used to detect the presence of ungrounded objects such as water droplets or coins, and delay periodic local baseline offset adjustments until these objects have largely disappeared. To do otherwise could produce inaccurate normalized sensor output values. This also relates to the application of a global baseline offset to quickly modify the sensor offset values to account for conditions such as rapid temperature changes. Background pixels not part of any touch regions can be used to detect changes to no-touch sensor output values and compute the global baseline offset accordingly. This also relates to the use of motion dominance ratios and axis domination confidence values to improve the accuracy of locking onto dominant motion components as part of gesture recognition.

Image Jaggedness Filter for Baseline Calculations

To provide a more uniform response from the touch sensor panel given the same amount of touch, touch sensor panel output values can be calibrated using offset values to adjust the raw no-touch output values for each sensor in the panel so that all touch sensor panel output values are normalized to approximately the same value. However, even with normalized sensor outputs, temperature drift and other factors can cause the sensor output values to change, which will tend to skew the normalized baseline. To account for these gradual changes to the normalized sensor output values, a periodic local baseline offset adjustment algorithm can be employed.

Figure 1A:
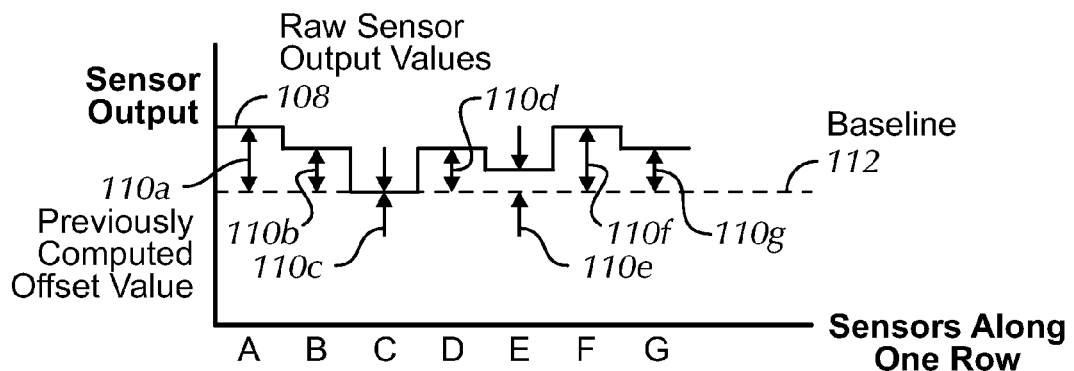
FIGS. 1a-1c illustrate an exemplary periodic local baseline adjustment for a single row of pixels in a touch sensor panel according to embodiments of the invention.
Figure 1B:
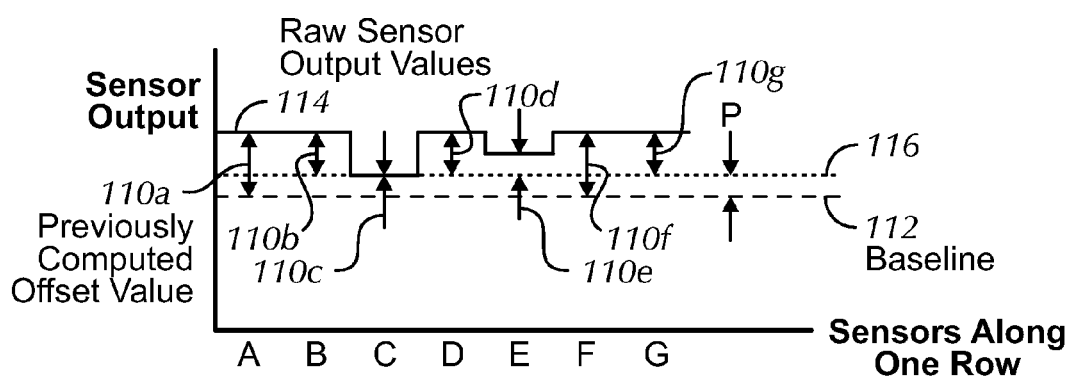
Figure 1C:
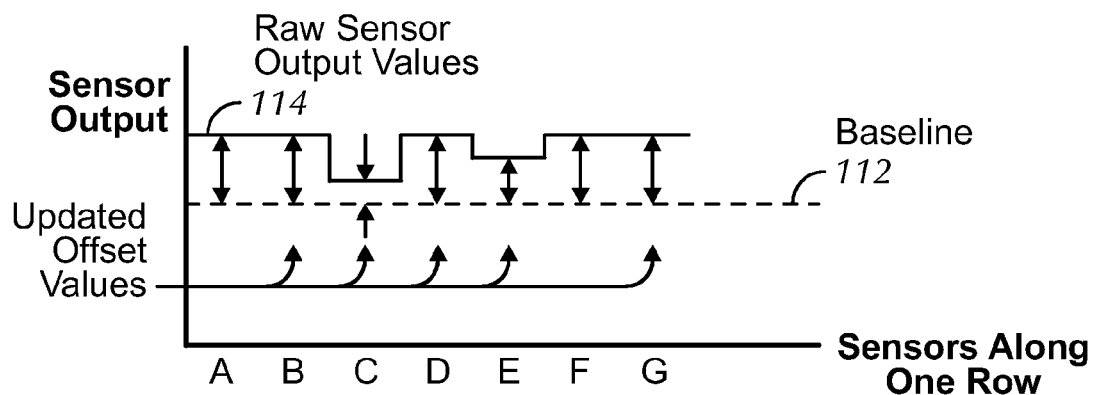

FIGS. 1a-1c illustrate an exemplary periodic local baseline adjustment for a single row of pixels (sensors) A-G in a touch sensor panel according to embodiments of the invention. Although not shown, it should be understood that each row in the touch sensor panel can also be subject to this periodic local baseline adjustment. The periodic local baseline offset adjustment algorithm can increment or decrement individual sensor offset values by one count or unit, or some small value to provide periodic fine-tuning of the offsets to track temperature drift or other shifts in the sensor output values.

As shown in FIG. 1a, to perform this periodic local baseline offset adjustment, a no-touch scan of the sensor panel is performed after a dynamic adjustment time interval has passed, and raw sensor output values 108 are obtained. The adjustment time interval is generally much longer than the frame rate (the time it takes to scan the entire sensor panel one time). Previously computed offset values for each sensor (see 110-A through 110-G) are then subtracted from the measured raw sensor output values 108 to normalize them. Ideally, as shown in FIG. 1a, the subtraction results in all normalized sensor output values being equal to the same baseline value 112.

However, as shown in FIG. 1b, if some of the no-touch measured raw sensor output values 114 shift due to a change in some condition such as a temperature increase, for example, after subtraction of the offset values 110-A through 110-G, some of the normalized sensor output values may be equal to some value other than baseline value 112, such as value 116 in FIG. 1b. To adjust for this shift according to embodiments of the invention, all sensors having normalized sensor output values that are positive and negative as compared to the baseline 112 are identified. (In the example of FIG. 1b, the normalized sensor values for sensors B-E and G are positive.) For any sensors with normalized sensor output values that are positive, their corresponding offset values are incremented by P, where P may be one count, or a small value, or a percentage of the positive value. In the example of FIG. 1b, P represents the full difference between value 116 and the original baseline 112, but it should be understood that if P represents less than the full difference between value 116 and the original baseline 112, multiple periodic local baseline offset adjustments can eventually take up the full difference. Similarly, for any sensors with normalized sensor output values that are negative, their corresponding offset values are decremented by Q, where Q may be one count, or a small value, or a percentage of the negative value. The algorithm waits the duration of an adjustment period before scanning the panel again.

As shown in FIG. 1c, after the sensor offset values for sensors B-E and G have been adjusted, the normalized sensor output values should be closer to the original baseline 112. In the example of FIG. 1c, because the offset adjustment value P represented the full difference between value 116 and the original baseline 112, the normalized sensor output values equal the original baseline 112.

Despite this normalization, in multi-touch sensor panels, certain pixels can generate false, erroneous or otherwise distorted readings when two or more simultaneous touch events are generated by the same poorly grounded object. Compensation of these distorted readings (so-called "negative pixels") is described in U.S. application Ser. No. 11/963,578 entitled "Negative Pixel Compensation," the contents of which are incorporated by reference herein in their entirety for all purposes. To compensate for these distorted readings, a predicted negative pixel value can first be computed as an indicator of pixels that are likely to be distorted. The predicted negative pixel value for any particular pixel can be computed by summing up the touch output values for pixels in the drive line of the particular pixel being considered, summing up the touch output values for pixels in the sense line of the particular pixel being considered, and then multiplying these two sums. A scaled function of the predicted negative pixel value can then be added to the measured touch output value for the pixel to compensate for artificially negative readings.

However, due to physical design changes, state-of-the-art touch sensor panels can have a greater incidence of negative pixels than previous touch sensor panels. In trackpad embodiments, for example, negative pixels can appear more frequently due to the expected frequent usage of unplugged notebook computers, which can cause a higher incidence of touches by ungrounded objects. Thus, for a given image of touch, there can be a higher sum of negative and positive pixels than in previous designs.

Water droplets on a touch sensor panel can also appear as ungrounded objects. On trackpads, where user fingers and palms are often touching (sometimes inadvertently) the panel, water droplets can easily get smeared. Therefore, if the possible presence of water droplets can be detected, it would be preferable to hold off on any periodic local baseline offset adjustment until the water has dried off, because of the likely existence of corrupting negative pixels.

To suppress periodic local baseline offset adjustments in the presence of water droplets, extra filters can first be employed to detect the presence of water droplets. To detect water droplets, a jaggedness/irregularity filter can be used, as described in U.S. application Ser. No. 11/619,490 entitled "Irregular Input Identification," now U.S. Pat. No. 8,269,727, and U.S. application Ser. No. 11/756,211 entitled "Multi-touch Input Discrimination," now U.S. Pat. No. 8,130,203, both of which are incorporated by reference herein in their entirety for all purposes. This jaggedness/irregularity filter can be used to find touch images having a high spatial frequency, such as those caused by water droplets.

Figure 2A:
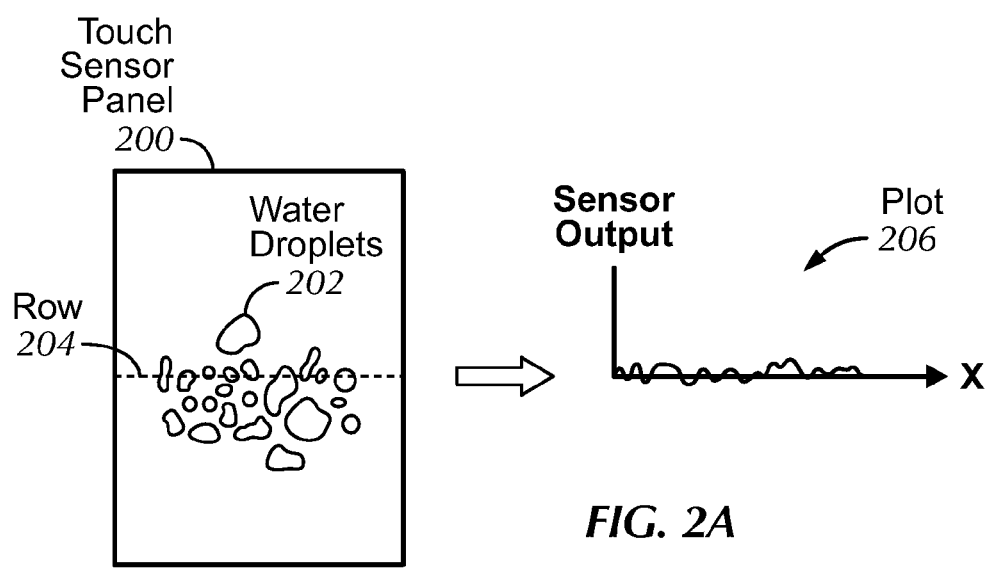
FIG. 2a illustrates an exemplary touch sensor panel having water droplets on its touch surface and the resulting touch image having a high spatial frequency.

FIG. 2a illustrates an exemplary touch sensor panel 200 having water droplets 202 on its touch surface. The sensors in row 204 can generate touch outputs as shown in plot 106. Plot 206 shows that water droplets 202, being ungrounded, can generate raw touch sensor output values having a high spatial frequency (a high frequency of occurrence of touch images in space), a certain jaggedness in the captured image, and a number of positive and negative pixels. Although not shown in FIG. 2, a similar plot can be obtained for every row and column in touch sensor panel 200.

Figure 2B:
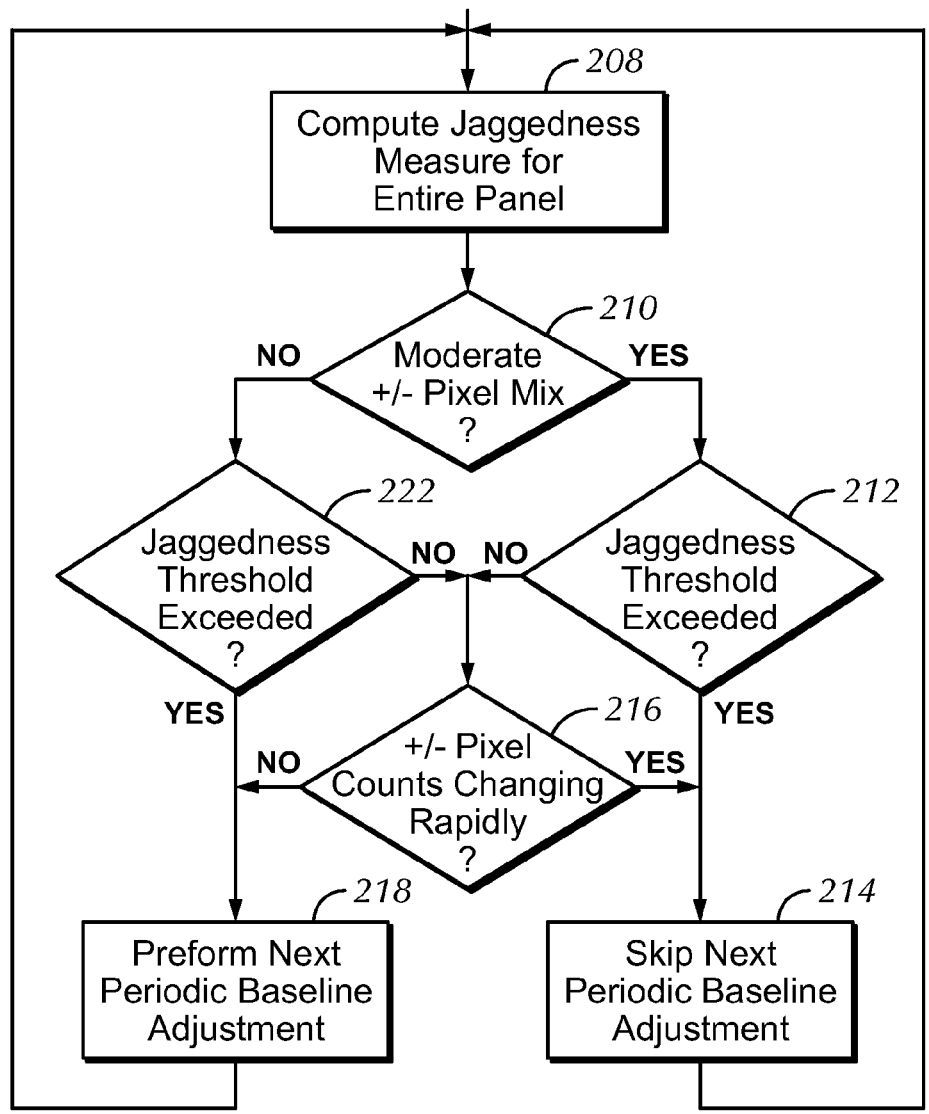
FIG. 2b illustrates an exemplary flow diagram of the use of the image jaggedness filter according to one embodiment of this invention.

FIG. 2b illustrates an exemplary flow diagram of the use of the image jaggedness filter according to embodiments of the invention. In FIG. 2, a jaggedness measure can be obtained at 208. To accomplish this, the jaggedness/irregularity filter as mentioned above can be applied to all rows and columns to generate a jaggedness measure for the entire image. In some embodiments, the jaggedness measure for all rows and columns can be averaged and normalized. Alternatively, a spatial Fourier transform can be used.

If a moderate (relatively even) mix of negative and positive pixels are found or are within a particular mix threshold at 210, and a certain jaggedness threshold is exceeded at 212, indicating the presence of numerous poorly grounded objects such as water droplets, then the next periodic local baseline offset adjustment can be skipped at 214. For example, a "moderate" mix of negative and positive pixels may be defined as having percentages of negative and positive pixels are within 40% of each other −30% and 70%. All other percentages would not be considered "moderate." Additionally, if the jaggedness measure is normalized between [0,1], with "0" being not jagged (no ungrounded objects) and "1" being completely jagged (many small ungrounded objects), then the jaggedness threshold could be set to 0.5.

If the jaggedness threshold is not exceeded at 212, but the number of positive and negative pixels is changing rapidly at 216 (which can occur when water droplets are evaporating), periodic local baseline offset adjustments can also be suppressed at 214. To make this determination of whether the number of positive and negative pixels are changing rapidly, the sums of the negative and positive pixels can be passed though a (mathematical) low pass filter (LFP) that produces an auto-regressive average. Instantaneous values can then be subtracted from the average. If the difference is high (greater than a predetermined threshold, such as the instantaneous value being more than 25% different from the computed average), this indicates a large change in the number of negative or positive pixels sufficient to suppress periodic local baseline offset adjustments. On the other hand, if the number of positive and negative pixels is not changing rapidly at 216, then the next periodic local baseline offset adjustment can occur as scheduled at 218 (including the suppression of an initial baseline capture if fingers are detected at startup, as disclosed in U.S. application Ser. No. 11/650,112 entitled "Periodic Sensor Panel Baseline Adjustment," the contents of which are incorporated by reference herein in their entirety for all purposes).

If the mix of negative and positive pixels is not moderate at 210 (e.g. many more positive pixels than negative pixels, or vice versa), the jaggedness threshold is not exceeded at 222, and the mix of negative and positive pixels is changing rapidly at 216, periodic local baseline offset adjustments can be suppressed at 214. However, if the mix of negative and positive pixels is not changing rapidly at 216, periodic local baseline offset adjustments can be performed at 218.

After enough water evaporates, no significant number of negative pixels may remain, but some positive pixels may remain. If the positive pixels are scattered spatially, they can still cause the jaggedness measure to be above the threshold. Note that the jaggedness algorithm may only recognize that the jaggedness measure has exceeded a threshold—it does not see actual negative and positive pixels, so it cannot determine that there are few negative pixels remaining. Thus, if the mix of negative and positive pixels is not moderate at 210, but the jaggedness threshold is exceeded at 222, periodic local baseline offset adjustments can be performed at 218. In addition, to compensate for this effect, the increment/decrement rate of the adaptation algorithm can be sped up, so that the positive pixels are compensated more quickly and the effect is reduced.

Global Baseline Offset

As described above, there are situations in which it can be preferable to delay periodic local baseline offset adjustments so that ungrounded touches do not cause erroneous adjustments to the sensor offset values. Additionally, with conventional keyboards having trackpads, inadvertent touch events can be commonplace while the keyboard is being utilized, presenting another situation where it can be preferable to keep the adaptation rate slower so that patches due to hovering or inadvertent touches do not get incorporated into the sensor offset values. However, it can still desirable to quickly compensate for temperature or other global effects.

Therefore, in addition to the periodic local baseline offset adjustment algorithm described above that can cause sensor offset values to be incrementally adapted or changed on a pixel-by-pixel (local) basis, in other embodiments of the invention a global baseline offset can be applied to the offset values for all pixels. The global baseline offset can be used to effect changes much more quickly than the periodic local baseline offset adjustment algorithm to compensate for large temperature changes or the effects of other global conditions. In some embodiments, the full amount of this global baseline offset can be immediately applied to the offset values for all pixels. In other embodiments, the offset values for all pixels can be incremented or decremented gradually over time (but more often than the individual pixels can be incremented or decremented using local baseline offset adjustments), until the full amount of the global baseline offset has been applied.

Figure 3:
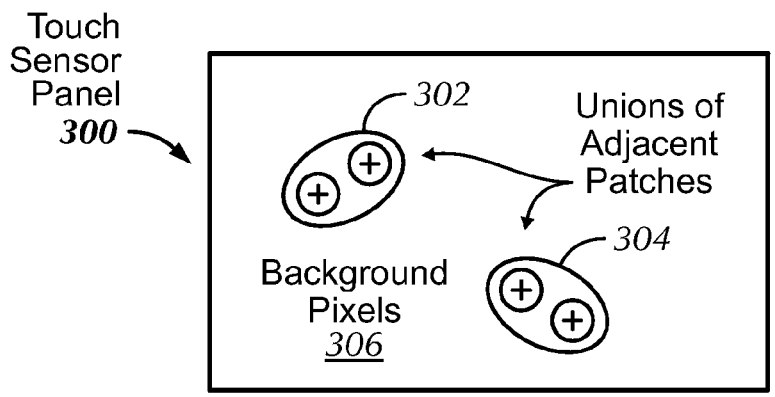
FIG. 3 illustrates an exemplary image of touch on touch sensor panel showing how a global baseline offset can be determined according to one embodiment of this invention.

FIG. 3 illustrates an exemplary image of touch on touch sensor panel 300 showing how a global baseline offset value can be determined according to embodiments of the invention. First, in some embodiments, unions of adjacent or nearby patches can be determined (see 302 and 304). To determine which patches should be grouped together, any number of methods can be used, such as computing the centroids of the patches and grouping together those pixels whose centroids are closest together. The union of those patches can be formed based on the touch sensor output values within the patches. For example, for any two grouped patches, all pixels within those two patches having touch sensor output values above a certain threshold can be considered part of the union. These union areas can be blocked out from subsequent calculations so that only background pixels 306 remain. In other embodiments, unions need not be formed, and only the patches themselves can be excluded from the background pixels.

An average of all or a portion of the background pixels 306 can then be computed, and this average can then used to globally modify the offset values for all pixels in the touch sensor panel. Because the background pixels 306 are untouched, the average of their untouched output values can provide an indication of rapid changes to the pixel outputs due to factors such as temperature. This average, or some adjustment value that is a function of this average, can then be added to or subtracted from the current sensor baseline to compute the global baseline offset value. This global baseline offset value can then be added to the current offset values for every pixel in the touch sensor panel to effect a global adjustment of the offset values. In some embodiments, this global baseline offset value can be applied immediately to the current offset values for every pixel. In other embodiments, the current offset values can be incremented or decremented gradually until the full global baseline offset values has been applied. To keep the normalized sensor output values from "running away" (e.g. getting excessively large or small) due to unintended artifacts of the algorithm such as an accumulation of roundoff error, the global baseline offset value can optionally decay to zero over time.

Figure 4A:
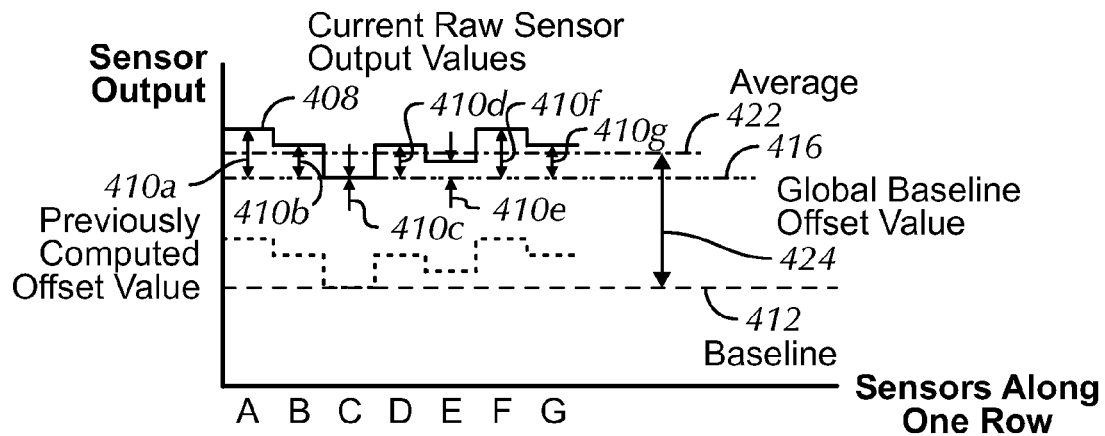
FIG. 4a illustrates the computation of an exemplary periodic global baseline offset adjustment value for a single row of pixels (sensors) A-G in a touch sensor panel according to embodiments of the invention.

FIG. 4a illustrates the computation of an exemplary periodic global baseline offset value for a single row of pixels (sensors) A-G in a touch sensor panel according to embodiments of the invention. Although not shown, it should be understood that each row in the touch sensor panel can be involved in the computation of this global baseline offset value. In the example of FIG. 4a, current no-touch (i.e. background) raw sensor output values 408 have risen substantially and in a fairly uniform manner from previous no-touch raw sensor output values 420 due to a change in some condition such as a temperature increase. As such, subtracting of the previous sensor offset values 410-A through 410-G from the current raw sensor output values 408 results in normalized values 416 well above the original baseline 412, which can create errors in touch detection and interpretation. To perform a global baseline offset adjustment on all offset values in the touch sensor panel, an average of the background pixels can first be computed. In the example of FIG. 4a, the average is shown at 422. Next, the difference between this average and the original baseline 412 can be computed as the global baseline offset value 424. This global baseline offset value 424 can then be added to the previous sensor offset values 410-A through 410-G to produce updated sensor offset values and effect a global adjustment of the offset values.

Figure 4B:
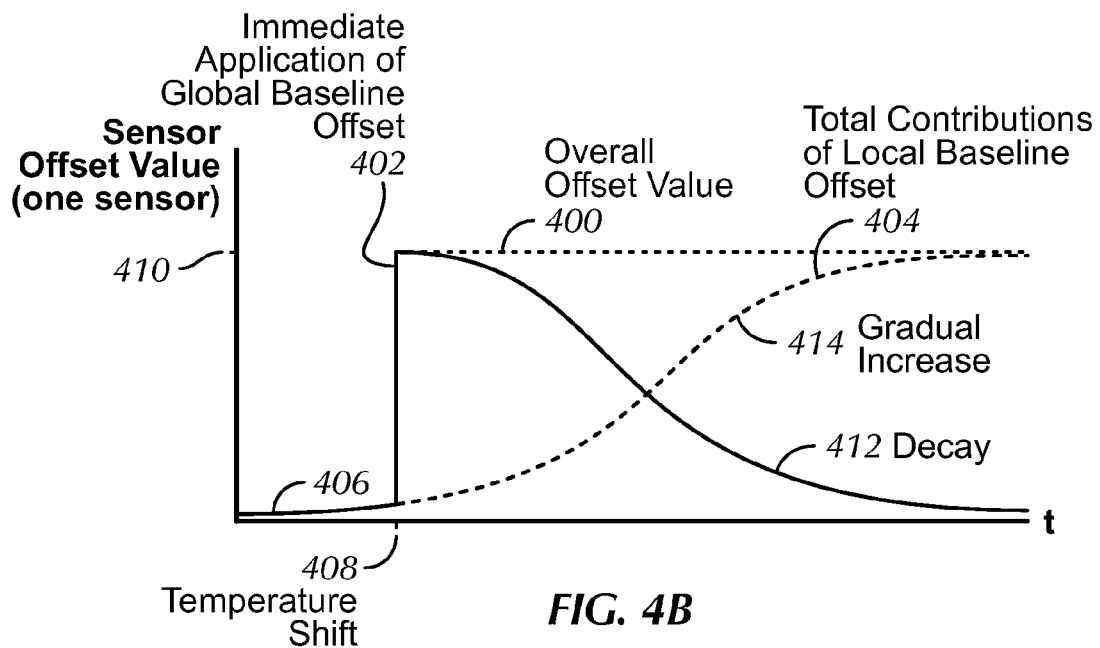
FIG. 4b illustrates an exemplary plot of the overall offset value for a single sensor over time including the total contributions of a local baseline offset and the contribution of a global baseline offset according to one embodiment of this invention.

FIG. 4b illustrates an exemplary plot of the overall offset value 400 for a single sensor over time including the total contributions of a local baseline offset 404 and the contribution of a global baseline offset 402 according to embodiments of the invention. In the example of FIG. 4b, the offset value 400, global baseline offset value 402, and the total contribution of the local baseline offset value 404 start near zero at 406, indicating that the raw no-touch sensor output value for that sensor is approximately equal to the desired baseline value. If a temperature shift or other environmental condition is detected at 408 resulting in a rapid increase in the average of the background pixels (e.g., a change of more than 25% over the span of a minute), the full amount of the calculated global baseline offset value 402 can be immediately added to the sensor offset value, causing the overall sensor offset value 400 to increase rapidly to a value 410 equal to the difference between the average of the background pixels and the original baseline as described above. The global baseline offset value 402 can then decay back to zero over time at 412 to ensure that the offset value does not get excessively large or small due to unintended artifacts of the algorithm.

However, if the increase in the raw sensor output values remains, even while the global baseline offset value 402 is decaying back down to zero, another mechanism is needed to ensure that an increase to the overall offset value does occur. To accomplish this, the local baseline offset adjustment algorithm described above can periodically incrementally increase the overall offset value 400 as the global baseline offset value 402 is decaying. Although each increment to the overall offset value 400 made by the local baseline offset adjustment algorithm is small, the total contribution of the local baseline offset value 404 gradually increases over time, as shown at 414 in FIG. 4b.

Figure 4C:
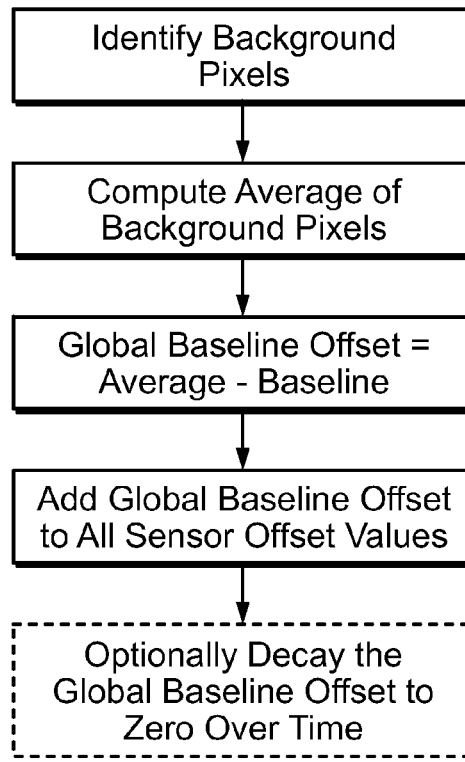
FIG. 4c illustrates an exemplary flowchart or algorithm for implementing the global baseline offset algorithm according to embodiments of the invention.

FIG. 4c illustrates an exemplary flowchart or algorithm for implementing the global baseline offset algorithm as described above according to embodiments of the invention.

Although not shown, similar adjustments to the overall sensor offset value of each pixel can be made in the negative direction if the average of the background pixels rapidly decreases.

Figure 4D:
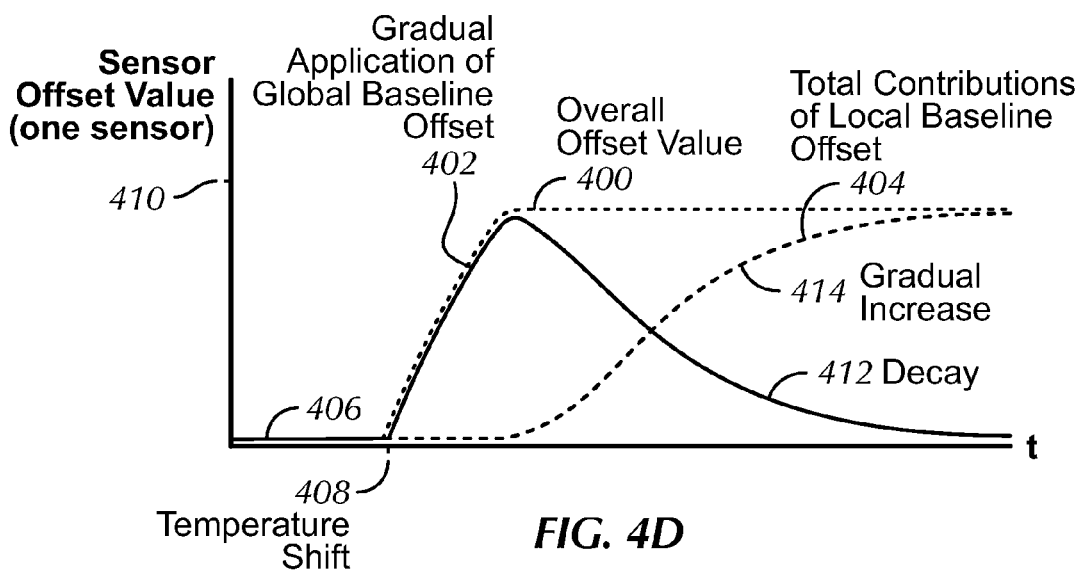
FIG. 4d illustrates an exemplary plot of the overall offset value for a single sensor over time wherein the global baseline offset value is applied to the sensor offset value gradually according to embodiments of the invention.

FIG. 4d illustrates an exemplary plot of the overall offset value 400 for a single sensor over time wherein the global baseline offset value is applied to the sensor offset value gradually according to embodiments of the invention. In the example of FIG. 4d, the global baseline offset value 402 can be incrementally added to the sensor offset value, causing the overall sensor offset value 400 to increase gradually to a value 410 equal to the difference between the average of the background pixels and the original baseline as described above. It should be noted that although the global baseline offset value is applied incrementally, the increment period can be much faster than the local baseline offset adjustment described above. The global baseline offset value 402 can then decay back to zero over time at 412 to ensure that the offset value does not get excessively large or small due to unintended artifacts of the algorithm.

Motion Component Dominance Factors for Motion Locking

In the processing of touch images, after touch images (e.g. from two fingers) are captured, identified and tracked over multiple panel scans, motion components can be extracted. In the case of two fingers, motion components can include the X component, the Y component, a scale (zoom) component (the dot product of the two finger motion vectors), and a rotate component (the cross product of the two finger motion vectors). The extracted motion components can provide for two types of control. "Integral control" is defined herein as providing all four degrees of freedom (the ability to control all axes at once). "Separable control" is more limited, and separates motion between either (1) X-Y scrolling as a set, (2) zoom, or (3) rotate (i.e. one axis).

Figure 5:
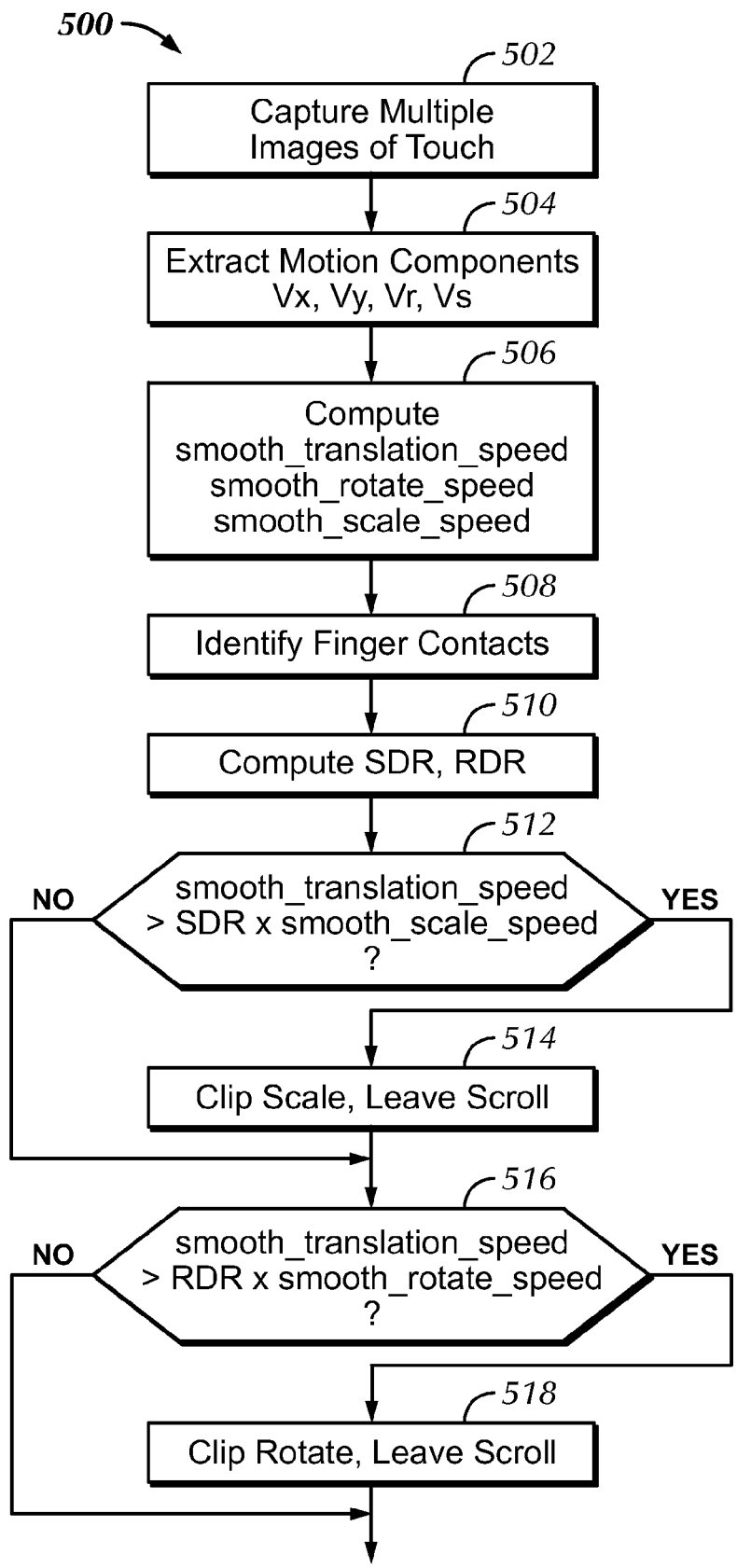
FIG. 5 illustrates an exemplary motion component dominance algorithm that can be implemented by a processor executing firmware according to embodiments of the invention.

FIG. 5 illustrates an exemplary motion component dominance algorithm 500 that can be implemented by a processor executing firmware according to embodiments of the invention. After multiple images of touch are captured at 502, motion components such as the x-direction velocity (Vx), y-direction velocity (Vy), rotational velocity (Vr), and scaling velocity (Vs) can be extracted at 504. To implement separable control, embodiments of the invention can lock onto the first component (axis) with significant motion, and ignore the others. For example, if significant X-Y scrolling is detected first, subsequently detected zooming motions may be ignored until liftoff of the fingers. To lock onto the first component with significant motion, a low pass filter (LPF) can be applied to the computed velocities of the extracted motion components to compute the following at 506:

Smooth_translation_speed=$(LPF(Vx)^2+LPF(Vy)^2)^{0.5}$

Smooth_rotate_speed=$LPF(Vr)$

Smooth_scale_speed=$LPF(Vs)$

Note that the smooth_translation_speed value includes Vx and Vy because of the desire to lock onto scrolling as a whole, not just the X and Y components. Of these three values, the dominant (largest) computed speed can be used, while the others can be ignored (zeroed or clipped out).

However, in practice it can be difficult to lock on properly, because a scroll motion might initially look like a rotate motion, for example, or vice versa. Therefore, in embodiments of the invention, the three raw values described above can be utilized in conjunction with two new parameters, scale_dominance_ratio (SDR) and rotate_dominance_ratio (RDR), which can be used to apply weights to the various motion components and set a balance point for the motions so that a particular component can be locked onto more accurately. The SDR and RDR values can be established after the various finger contacts are identified at 508. The SDR and RDR values computed at 510 can be based on whether the detected contacts are identified as fingers and/or thumbs. For example, if a thumb is detected, it can be more likely that a user is using a thumb and finger to perform a scaling (zoom) or rotate operation rather than a translation or scroll operation, so the SDR and RDR values can be set to high values (e.g. 2.5) so that the Smooth_scale_speed or the Smooth_rotate_speed values dominate the Smooth_translation_speed value.

However, if two or more fingers are detected, but not a thumb, it is more likely that a user is using the two fingers to perform a translation or scroll operation rather than a scaling or rotate operation, so the SDR and RDR values can be set to lower values to ensure that the Smooth_translation_speed value dominates. The multiple-finger, no-thumb SDR value can further be a function of the horizontal separation of the fingers, because it can be more likely that a user is performing a translation or scroll operation when the fingers are close together, but more likely that a user is performing a two finger scaling operation when the fingers have a greater separation. Thus, for example, the SDR can be set to 0.25 if the finger separation is between 0 and 3 cm, can vary from 0.25 to 1.25 if the separation is from 3-6 cm, and can be set to 1.25 for separations greater than 6 cm.

In further embodiments, an exception can be created for the SDR during a two-finger top-to-bottom translation because of the tendency for a user's fingers to draw together during the translation. The movement of the fingers towards each other during the translation should not be interpreted as a scaling operation. To prevent this, if a downward translation is detected plus a scale contraction, then the SDR can be maintained at 0.25, even if the two finger separation distance is high.

After the SDR and RDR values are computed at 510, the following pseudocode can then be implemented at 512, 514, 516 and 518:

Variables: scale_dominance_ratio (SDR), rotate_dominance_ratio (RDR)

If (smooth_translation_speed>SDR×smooth_scale_speed), then

Clip scale ($Vx{\rightarrow}pass$, $Vs{\rightarrow}zero$)

Leave scroll;             (A)

If (smooth_translation_speed>RDR×smooth_rotate_speed), then

Clip rotate ($Vx{\rightarrow}pass$, $Vr{\rightarrow}zero$)

Leave scroll.             (B)

In other embodiments, where the movement of contacts along with contact identifications provides an ambiguous determination of which motion component to lock onto, locking onto a particular motion component can be delayed until enough motion has occurred to make a more accurate determination. To accomplish this, an axis_domination_confidence value can be computed to provide a representation of the unambiguousness of the motion component to be locked onto.

Figure 6:
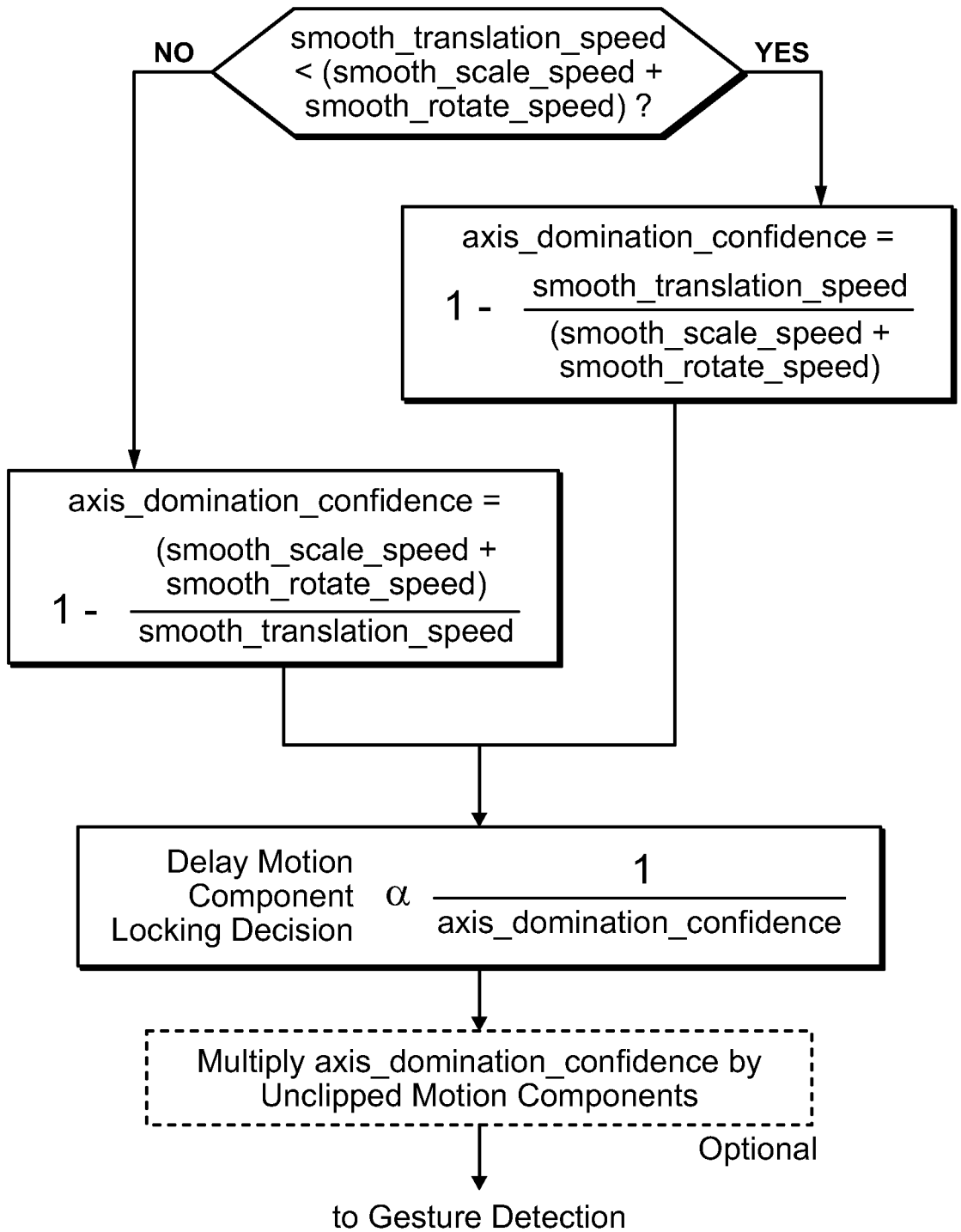
FIG. 6 illustrates an exemplary algorithm for computing an axis_domination_confidence value that can be implemented by a processor executing firmware according to embodiments of the invention.

FIG. 6 illustrates an exemplary algorithm 600 for computing an axis_domination_confidence value that can be implemented by a processor executing firmware according to embodiments of the invention. If smooth_translation_speed< (smooth_scale_speed+smooth_rotate_speed) at 602, then $$\text{axis\_domination\_confidence} = 1 - \frac{\text{smooth\_translation\_speed}}{\left(\begin{array}{c}\text{smooth\_scale\_speed} + \\ \text{smooth\_rotate\_speed}\end{array}\right)}.$$

at 604. Otherwise, at 606, $$\text{axis\_domination\_confidence} = 1 - \frac{\left(\begin{array}{c}\text{smooth\_scale\_speed} + \\ \text{smooth\_rotate\_speed}\end{array}\right)}{\text{smooth\_translation\_speed}}.$$

The axis_domination_confidence value as calculated above can be normalized to be between [0,1], where values approaching 1 represent a pure translation (and therefore there is high confidence in locking on to the X-Y motion components) and values approaching 0 indicate that the translation amount is about equal to the scale and rotation amount (and therefore low confidence in locking on to any motion component).

After the axis_domination_confidence value is computed, in one embodiment the motion component locking decision can be delayed by an amount proportional to the inverse of the axis_domination_confidence value at 608. Thus, if the value is high, indicating high confidence, there can be little or no delay. However, if the value is low, indicating low confidence, the locking decision can be delayed to allow for the motion components to become less ambiguous.

In another embodiment, the axis_domination_confidence value (or the square of this value) can be multiplied by any non-clipped motion components (see, e.g., equations (A) and (B) above) at 610. This has the effect of slowing down the ultimate gesture decision. For example, if the axis_domination_confidence value is 1 and this is multiplied by the unclipped motion component, the motion will be locked onto and integrated quickly in gesture detection algorithms. However, if no motion component has been locked onto, and motion is being integrated but the dominant motion component is borderline, when the motion component is multiplied by a low axis_domination_confidence value, this can dampen the motion and extend the integration period. This can delay the triggering of a decision on which motion components to pass and which motion components to clip and ultimately the identification of gestures. During this delay time, the motions can become more unambiguous. Once locked, it is not necessary to apply the axis_domination_confidence value any more.

Embodiments of the invention described above can be implemented, for example, using touch sensor panels of the types described in U.S. application Ser. No. 11/650,049 entitled "Double-Sided Touch Sensitive Panel and Flex Circuit Bonding." Sense channels of the types described in U.S. application Ser. No. 11/649,998 entitled "Proximity and Multi-Touch Sensor Detection and Demodulation" can be used, for example, to detect touch and hover events. The resulting image of touch can be further processed to determine the location of the touch events, the identification of finger contacts, and the identification of gestures as described, for example, in U.S. application Ser. No. 11/428,522 entitled "Identifying Contacts on a Touch Surface," U.S. application Ser. No. 11/756,211 entitled "Multi-touch Input Discrimination," and U.S. application Ser. No. 10/903,964 entitled "Gestures for Touch Sensitive Input Devices." All of the preceding applications referred to in this paragraph are incorporated by reference herein in their entirety for all purposes.

Figure 7:
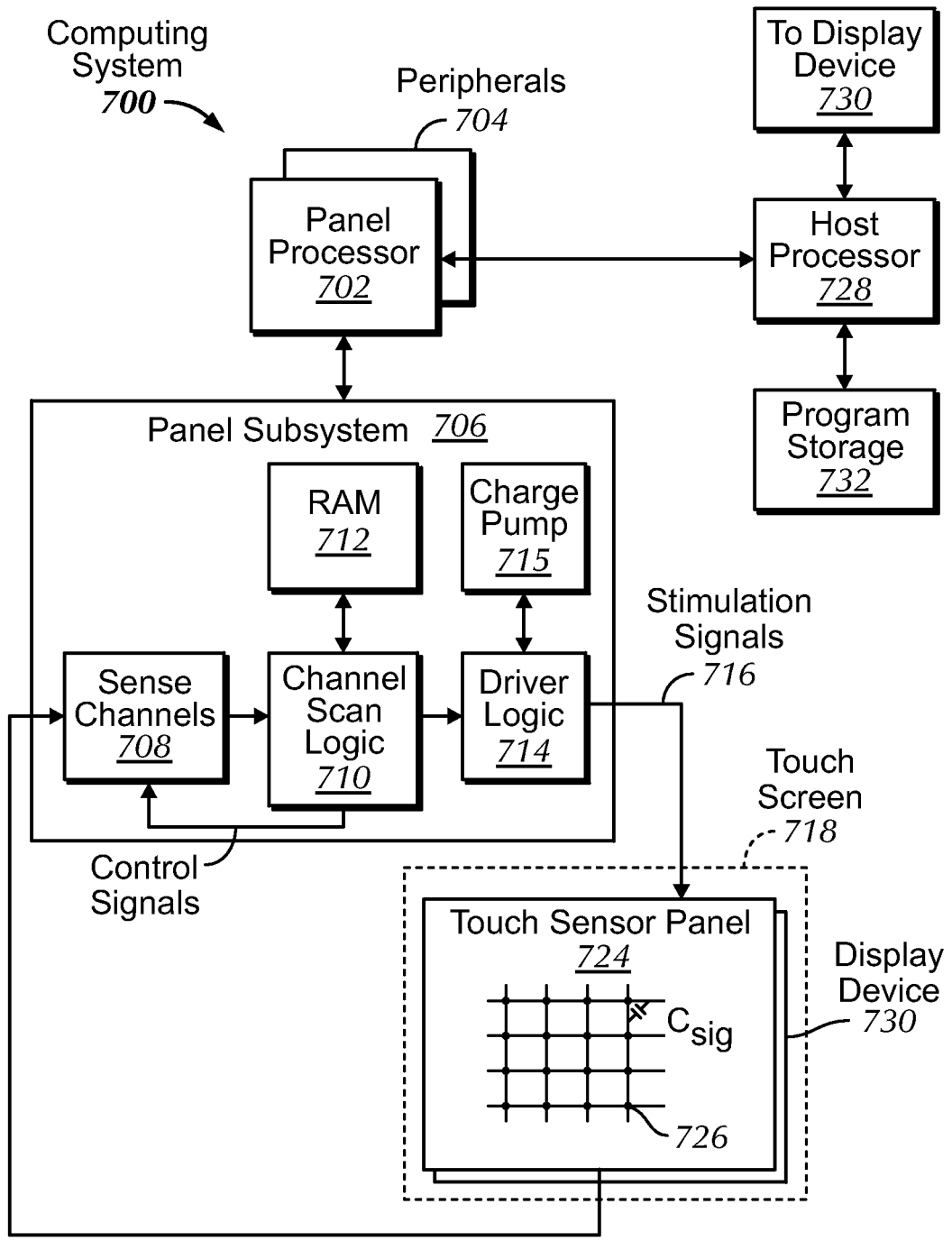
FIG. 7 illustrates an exemplary computing system operable with a touch sensor panel to implement the image jaggedness filter, global baseline offset, and motion component dominance factors according to one embodiment of this invention.

FIG. 7 illustrates exemplary computing system 700 that can include one or more of the embodiments of the invention described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724 at a voltage established by charge pump 715. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. Each intersection, adjacency or near-adjacency of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can drive sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device. Display device 730 together with touch sensor panel 724, when located partially or entirely under the touch sensor panel, or partially or entirely integrated with the touch sensor panel, can form touch screen 718.

Note that one or more of the functions described above can be performed by firmware stored in memory (e.g. one of the peripherals 704 in FIG. 7) and executed by panel processor 702, or stored in program storage 732 and executed by host processor 728. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any storage medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
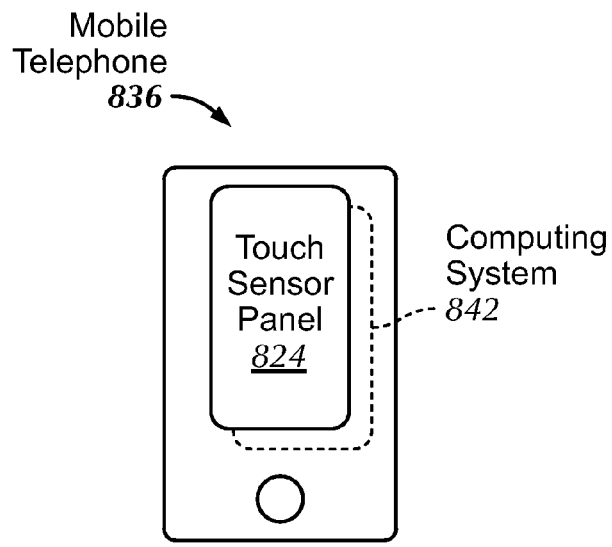
FIG. 8a illustrates an exemplary mobile telephone that can include a touch sensor panel and computing system for implementing the image jaggedness filter, global baseline offset, and motion component dominance factors according to one embodiment of this invention.

FIG. 8a illustrates exemplary mobile telephone 836 that can include touch sensor panel 824 and computing system 842 for implementing the image jaggedness filter, global baseline offset, and motion component dominance factors described above according to embodiments of the invention.

Figure 8B:
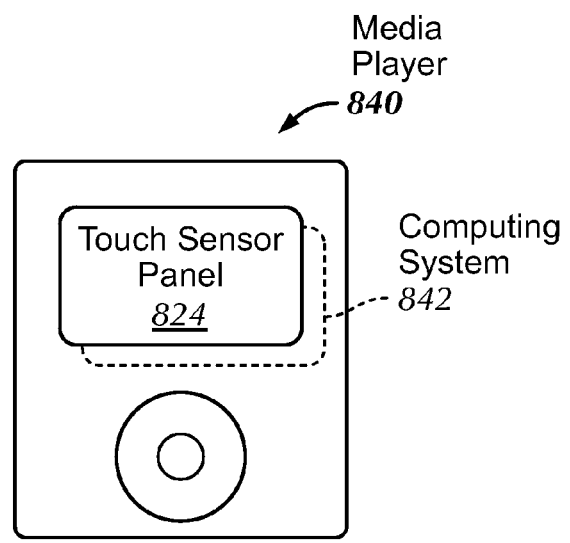
FIG. 8b illustrates an exemplary digital media player that can include a touch sensor panel and computing system for implementing the image jaggedness filter, global baseline offset, and motion component dominance factors according to one embodiment of this invention.

FIG. 8b illustrates exemplary digital media player 840 that can include touch sensor panel 824 and computing system 642 for implementing the image jaggedness filter, global baseline offset, and motion component dominance factors described above according to embodiments of the invention.

Figure 8C:
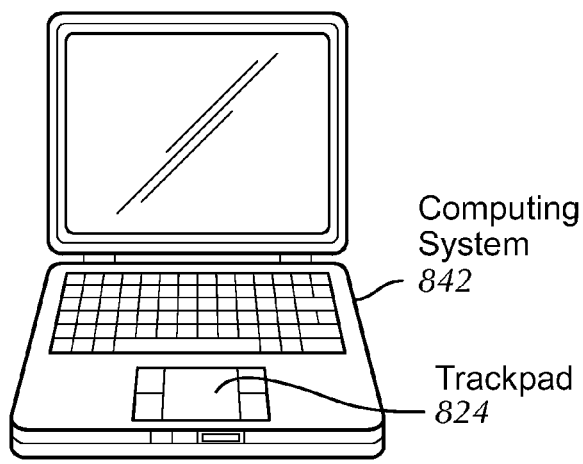
FIG. 8c illustrates an exemplary personal computer that can include a touch sensor panel and computing system for implementing the image jaggedness filter, global baseline offset, and motion component dominance factors according to one embodiment of this invention.

FIG. 8c illustrates exemplary personal computer 844 that can include touch sensor panel (trackpad) 824 and computing system 842 for implementing the image jaggedness filter, global baseline offset, and motion component dominance factors described above according to embodiments of the invention. The mobile telephone, media player, and personal computer of FIGS. 8a, 8b and 8c can advantageously benefit from the image jaggedness filter, global baseline offset, and motion component dominance factors described above because implementation of these features can improve the normalized outputs of the touch sensor panel and the recognition of gestures.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of delaying a periodic baseline adjustment of a plurality of touch sensor outputs on a touch sensor panel until objects having a high spatial frequency have been substantially removed from the touch sensor panel, comprising:
computing a jaggedness measure for at least a portion of the plurality of touch sensor outputs based on a plurality of computed differences between the portion of the plurality of touch sensor outputs, the plurality of computed differences including differences between each of the touch sensor outputs in the portion and at least one other touch sensor output in the portion; and
delaying or performing the periodic baseline adjustment of the plurality of touch sensor outputs based at least in part on the jaggedness measure.

2. The method of claim 1, further comprising:
delaying the periodic baseline adjustment of sensor outputs if the jaggedness measure exceeds a first predetermined threshold.

3. The method of claim 1, further comprising:
delaying the periodic baseline adjustment of sensor outputs if a positive and negative pixel mix is within a second predetermined threshold, and if the jaggedness measure exceeds a first predetermined threshold.

4. The method of claim 1, further comprising:
delaying the periodic baseline adjustment of sensor outputs although the jaggedness measure does not exceed a first predetermined threshold, if a positive and negative pixel mix is within a second predetermined threshold, and a number of positive and negative pixels is changing faster than a third predetermined threshold.

5. The method of claim 1, further comprising:
delaying the periodic baseline adjustment of the sensor outputs although the jaggedness measure does not exceed a first predetermined threshold, and although a positive and negative pixel mix is outside a second predetermined threshold, if a number of positive and negative pixels is changing faster than a third predetermined threshold.

6. The method of claim 1, further comprising:
performing the periodic baseline adjustment of the sensor outputs if the jaggedness measure does not exceed a first predetermined threshold.

7. The method of claim 1, further comprising:
performing the periodic baseline adjustment of sensor outputs although the jaggedness measure exceeds a first predetermined threshold, if a positive and negative pixel mix is outside a second predetermined threshold.

8. The method of claim 1, further comprising:
performing the periodic baseline adjustment of sensor outputs if a positive and negative pixel mix is outside a second predetermined threshold, if the jaggedness measure does not exceed a first predetermined threshold, and a number of positive and negative pixels is not changing faster than a third predetermined threshold.

9. The method of claim 1, further comprising:
performing the periodic baseline adjustment of the sensor outputs although a positive and negative pixel mix is within a second predetermined threshold, if the jaggedness measure does not exceed a first predetermined threshold, and a number of positive and negative pixels is not changing faster than a third predetermined threshold.

10. The method of claim 1, further comprising:
computing the jaggedness measure by computing a jaggedness value for all drive and sense lines in the touch sensor panel, and averaging the jaggedness values.

11. The method of claim 4, further comprising:
determining if the number of positive and negative pixels is changing faster than the third predetermined threshold by passing sums of the negative and positive pixels through a low pass filter (LPF) to produce an autoregressive average, and comparing instantaneous positive and negative pixel values to the average.

12. A non-transitory computer-readable storage medium storing program code for delaying a periodic baseline adjustment of a plurality of sensor outputs on a touch sensor panel until objects having a high spatial frequency have been substantially removed from the touch sensor panel, the program code for causing performance of a method comprising:
determining a jaggedness measure of an obtained image of touch based on a plurality of computed differences between at least a portion of the plurality of touch sensor outputs in the image of touch, the plurality of computed differences including differences between each of the touch sensor outputs in the portion and at least one other touch sensor output in the portion; and
delaying or performing the periodic baseline adjustment of the plurality of touch sensor outputs based at least in part on the degree of spatial frequency.

13. The non-transitory computer-readable storage medium of claim 12, the program code further for delaying the periodic baseline adjustment of the sensor outputs if the jaggedness measure exceeds a first predetermined threshold.

14. The non-transitory computer-readable storage medium of claim 12, the program code further for delaying the periodic baseline adjustment of sensor outputs a positive and negative pixel mix is within a second predetermined threshold, and the jaggedness measure exceeds a first predetermined threshold.

15. The non-transitory computer-readable storage medium of claim 12, the program code further for delaying the periodic baseline adjustment of sensor outputs although the jaggedness measure does not exceed a first predetermined threshold, if a positive and negative pixel mix is within a second predetermined threshold, and a number of positive and negative pixels is changing faster than a third predetermined threshold.

16. The non-transitory computer-readable storage medium of claim 12, the program code further for delaying the periodic baseline adjustment of the sensor outputs although the jaggedness measure does not exceed a first predetermined threshold, and although a positive and negative pixel mix is outside a second predetermined threshold, if a number of positive and negative pixels is changing faster than a third predetermined threshold.

17. The non-transitory computer-readable storage medium of claim 12, the program code further for performing the periodic baseline adjustment of the sensor outputs if the jaggedness measure does not exceed a first predetermined threshold.

18. The non-transitory computer-readable storage medium of claim 12, the program code further for performing the periodic baseline adjustment of sensor outputs although the jaggedness measure exceeds a first predetermined threshold, if a positive and negative pixel mix is outside a second predetermined threshold.

19. The non-transitory computer-readable storage medium of claim 12, the program code further for performing the periodic baseline adjustment of sensor outputs if a positive and negative pixel mix is outside a second predetermined threshold, the jaggedness measure does not exceed a first predetermined threshold, and a number of positive and negative pixels is not changing faster than a third predetermined threshold.

20. The non-transitory computer-readable storage medium of claim 12, the program code further for performing the periodic baseline adjustment of the sensor outputs although a positive and negative pixel mix is within a second predetermined threshold, if the jaggedness measure does not exceed a first predetermined threshold, and a number of positive and negative pixels is not changing faster than a third predetermined threshold.

21. The non-transitory computer-readable storage medium of claim 12, the program code further for computing the jaggedness measure by computing a jaggedness value for all drive and sense lines in the touch sensor panel, and averaging the jaggedness values.

22. The non-transitory computer-readable storage medium of claim 15, the program code further for determining if the number of positive and negative pixels is changing faster than the third predetermined threshold by passing sums of the negative and positive pixels through a low pass filter (LFP) to produce an auto-regressive average, and comparing instantaneous positive and negative pixel values to the average.

23. A mobile telephone including a non-transitory computer-readable storage medium storing program code for delaying a periodic baseline adjustment of a plurality of touch sensor outputs on a touch sensor panel until objects having a high spatial frequency have been substantially removed from the touch sensor panel, the program code for causing performance of a method comprising:
computing a jaggedness measure for at least a portion of the plurality of touch sensor outputs based on a plurality of computed differences between the portion of the plurality of touch sensor outputs, the plurality of computed differences including differences between each of the touch sensor outputs in the portion and at least one other touch sensor output in the portion; and
delaying or performing the periodic baseline adjustment of the plurality of touch sensor outputs based at least in part on the jaggedness measure.

24. A media player including a non-transitory computer-readable storage medium storing program code for delaying a periodic baseline adjustment of a plurality of sensor outputs on a touch sensor panel until objects having a high spatial frequency have been substantially removed from the touch sensor panel, the program code for causing performance of a method comprising:
computing a jaggedness measure for at least a portion of the plurality of touch sensor outputs based on a plurality of computed differences between the portion of the plurality of touch sensor outputs, the plurality of computed differences including differences between each of the touch sensor outputs in the portion and at least one other touch sensor output in the portion; and
delaying or performing the periodic baseline adjustment of the plurality of touch sensor outputs based at least in part on the jaggedness measure.

25. A personal computer including a non-transitory computer-readable storage medium storing program code for delaying a periodic baseline adjustment of a plurality of sensor outputs on a touch sensor panel, until objects having a high spatial frequency have been substantially removed from the touch sensor panel, the program code for causing performance of a method comprising:
computing a jaggedness measure for at least a portion of the plurality of touch sensor outputs based on a plurality of computed differences between the portion of the plurality of touch sensor outputs, the plurality of computed differences including differences between each of the touch sensor outputs in the portion and at least one other touch sensor output in the portion; and
delaying or performing the periodic baseline adjustment of the plurality of touch sensor outputs based at least in part on the jaggedness measure.

* * * * *